United States Patent
Waddington, deceased et al.

[15] 3,693,264
[45] Sept. 26, 1972

[54] SIMULATING APPARATUS FOR TEACHING THE ART OF SAILING

[72] Inventors: Rogor Strange Waddington, deceased, late of Lausanne, Switzerland; by David Buckley Sharp, executor; Joan Rubinstein, executrix, both of London, England; Bruce Duval, Lausanne, Switzerland

[73] Assignee: T.P.I. Limited, Nassau, Bahamas

[22] Filed: May 17, 1971

[21] Appl. No.: 143,988

Related U.S. Application Data

[60] Division of Ser. No. 840,611, July 8, 1969, Pat. No. 3,597,856, which is a continuation-in-part of Ser. No. 775,559, Nov. 13, 1968, Pat. No. 3,471,943.

[52] U.S. Cl. .................................................... 35/11
[51] Int. Cl. ............................................. G09b 9/06
[58] Field of Search ......................................... 35/11

[56] References Cited

UNITED STATES PATENTS 2,208,083  7/1940  Rousseau ........................ 35/11
2,855,702  10/1958  Taylor ............................ 35/11

Primary Examiner—Wm. H. Grieb
Attorney—Jacobs & Jacobs

[57] ABSTRACT

Sensitivity control means are provided for modifying the response of a sailing simulator to its helm to take into account the supposed wind force. Allowance is preferably made for the supposed wind direction and the boom setting.

The effect of the inertia of a craft upon steering may be represented by a capacitor and a thermistor. The effect of heeling upon helm sensitivity may be reproduced by transducers in the system. To demonstrate the effect of a center board on steering a transducer representing wind direction may be switched into or out of circuit.

Conveniently a wind force signal is provided as the output potential of a variable transformer and this potential is adjusted by the difference between the output potentials of two variable transformers, representing respectively wind direction and boom position relative to the wind, to provide an output which controls a reversible and stoppable variable-speed turning motor.

8 Claims, 9 Drawing Figures

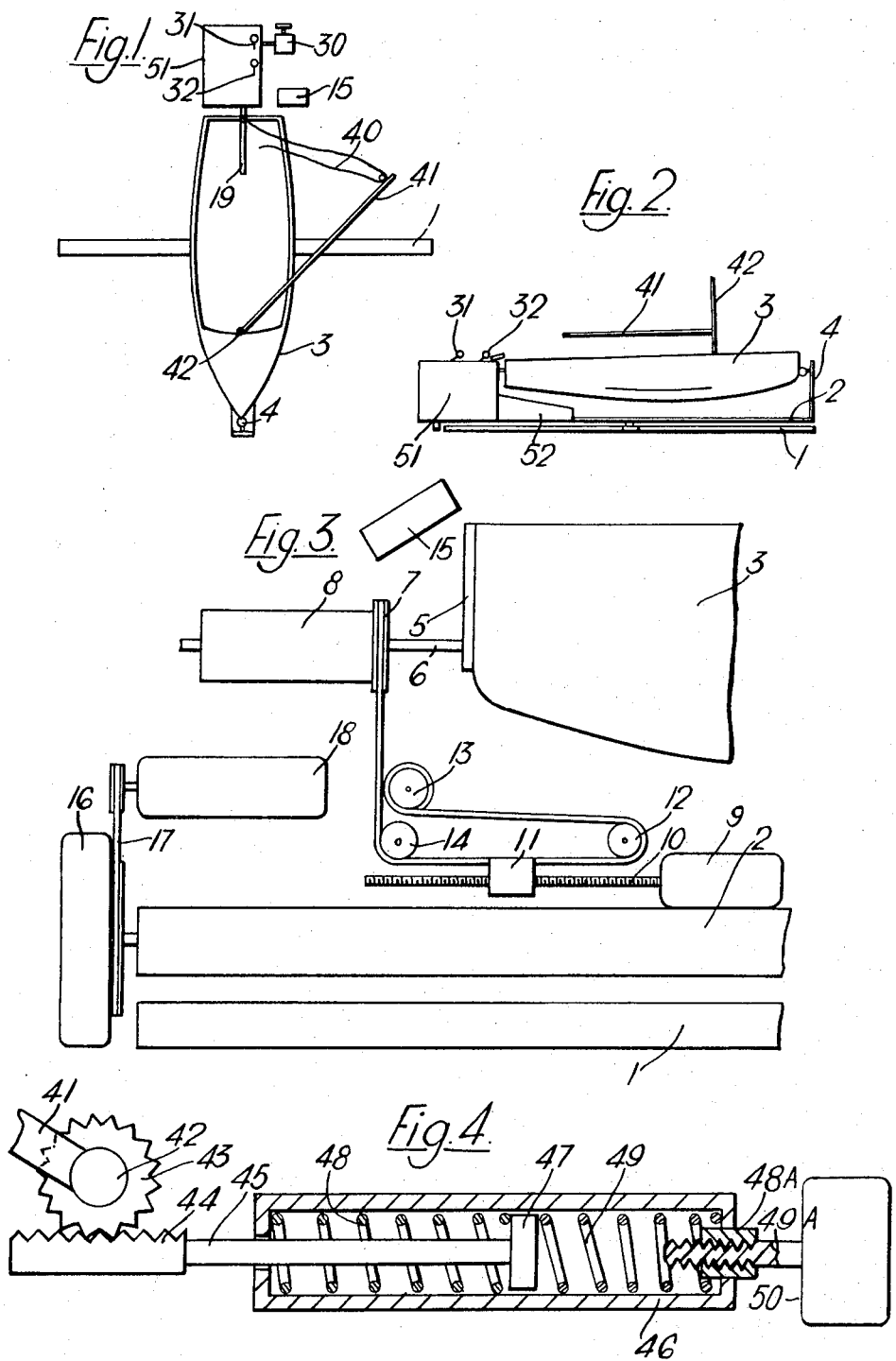

PATENTED SEP 26 1972

Inventor

By

Attorney

SIMULATING APPARATUS FOR TEACHING THE ART OF SAILING

This application is a division of Patent Application Ser. No. 840,611 filed July 8, 1969 now U.S. Pat. No. 3,597,856 which is a continuation in part of Patent application Ser. No. 775,559 filed Nov. 13, 1968 (U. S. Pat. No. 3,471,943) of Rogor Strange Waddington, now deceased, and Bruce Duval, one of the present Applicants.

The present invention relates to sailing training devices and has as an object the provision of a sailing simulator.

It is an object of the present invention to provide a sailing simulator having a hull unit mounted for variable heading in response to a helm to enable a pupil to experience the effect of the helm of a sailing craft.

A further object of the invention is to provide a simulator mounted for heeling movement so that a pupil can experience the heeling behavior of a sailing craft at the different points of sailing.

A still further object is to provide a simulator having a main sheet (e.g. a rope) operating a mainsail or supposed mainsail so that a pupil can experience the behavior of a sailing craft in response to the mainsheet. In actual sailing the operation of the mainsail by the main sheet governs the speed of the craft through the water. It also governs the degree of heeling.

Another object is to provide a simulator having a helm for varying the heading of the hull unit, which helm varies in its feel and its sensitivity, and in other respects, in a realistic manner.

With a simulator of the present invention a pupil can learn something of the art of sailing without needing to take a boat on water. Typically he has for manipulation the helm, which is preferably a tiller, and a mainsheet as in normal sailing. By the helm he can change the heading of the hull, usually by turning it about a fixed vertical axis, in either direction as in sailing, while sensing the pull of the mainsheet. The loading of the mainsheet and the heeling of the hull about the foreaft axis are advantageously made variable by a loading controller and a heeling controller respectively. In one arrangement the heeling controller and loading controller are arranged for operation by an instructor. In another and more preferred arrangement they are arranged for automatic operation; this arrangement involves complexity of construction, especially if the versatility of an instructor is to be imitated realistically but avoids the need for continuous attention of the instructor to a single pupil and enables him to supervise pupils on several simulators simultaneously.

In order to give the behavior of the helm an improved approach to the behavior of a helm in actual sailing, various refinements are desirable. Firstly, the sensitivity of the helm is preferably made variable by a sensitivity control so that the rate of turn of the hull about the vertical axis is greater for a given deflection at higher supposed speeds of the hull than at lower supposed speeds.

In one convenient arrangement the driving means for driving the hull to and fro about the vertical axis is a motor arranged to be varied in its speed by the resistance in a control circuit, the helm operates a variable resistance in the control circuit, and another variable resistance in the circuit, conveniently calibrated in knots, serves as a sensitivity control. To give the pupil an indication of the supposed speed, the hull may be provided with a speed indicator responsive to the sensitivity control or there may be provided a variable speed fan arranged to provide a wind effect.

Secondly, the stiffness of the helm is preferably variable to simulate the effect of changes of speed and sailing direction on the stiffness. In one convenient arrangement for this purpose, the helm is provided with loading springs which may be tensioned manually by the instructor or by automatic means through the intermediary of logical devices of the analog type.

Thirdly, in order to simulate the effects of lee and weather helm, the zero position of the helm, i.e. the position for which the hull does not rotate about the vertical axis, is preferably made variable. When the helm operates a variable resistance, this is conveniently achieved by means for moving the variable resistance relative to the helm.

Advantageously, the heeling means is connected with the hull via a resilient coupling, so that the extent of heeling is responsive to the pupil's position as well as to the heeling controller. With this arrangement the pupil is able, by shifting his position, and when appropriate by hanging out over the gunwale, to assist in balancing the hull.

In the interests of realism the mainsheet is preferably connected with a boom via which it is loaded as in actual sailing. The loading is preferably a resilient loading so that the pupil can make the boom move by pulling on the mainsheet. Advantageously the resilient loading is adjustable and, because of the magnitude of the forces involved, the adjustment is preferably power operated. In a preferred construction the boom is carried by a mast mounted for rotation and the loading operates via the mast.

The following description of examples of sailing simulators in accordance with the invention, in which description reference is made to the accompanying diagrammatic drawings, is given by way of illustration.

In the drawings:

FIG. 1 shows a first simulator in plan,

FIG. 2 shows the simulator of FIG. 1 in side elevation,

Figure 5:
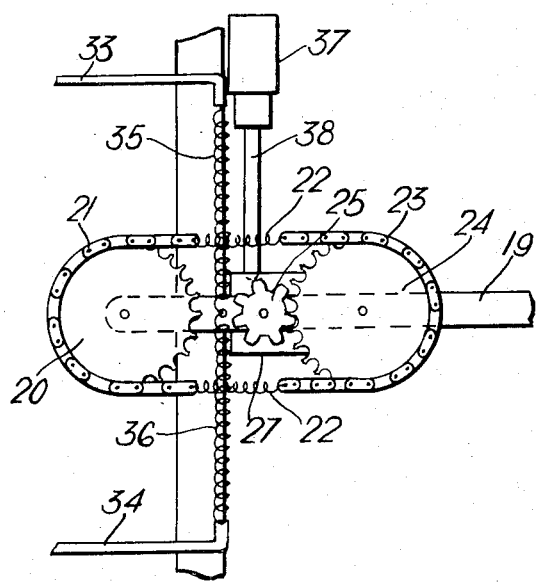
Figure 6:
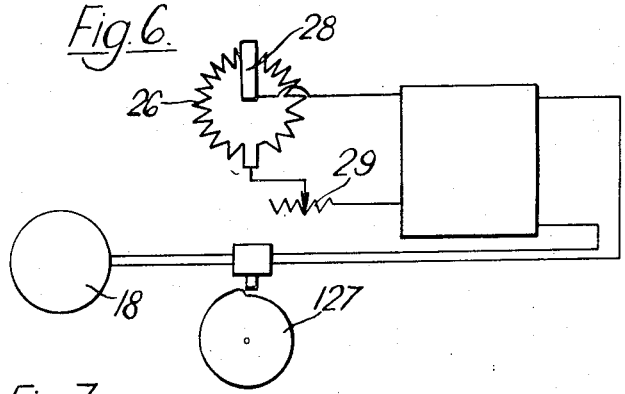
Figure 7:
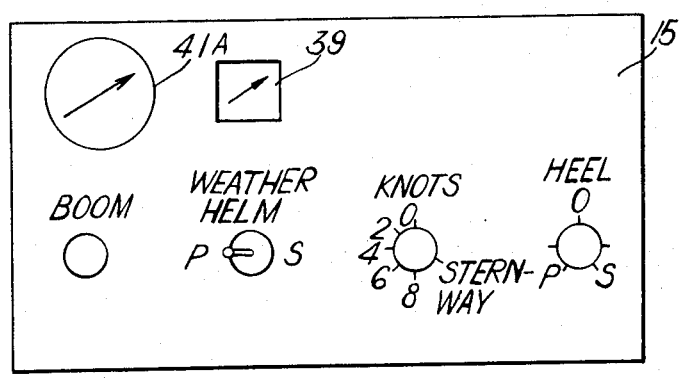
Figure 8:
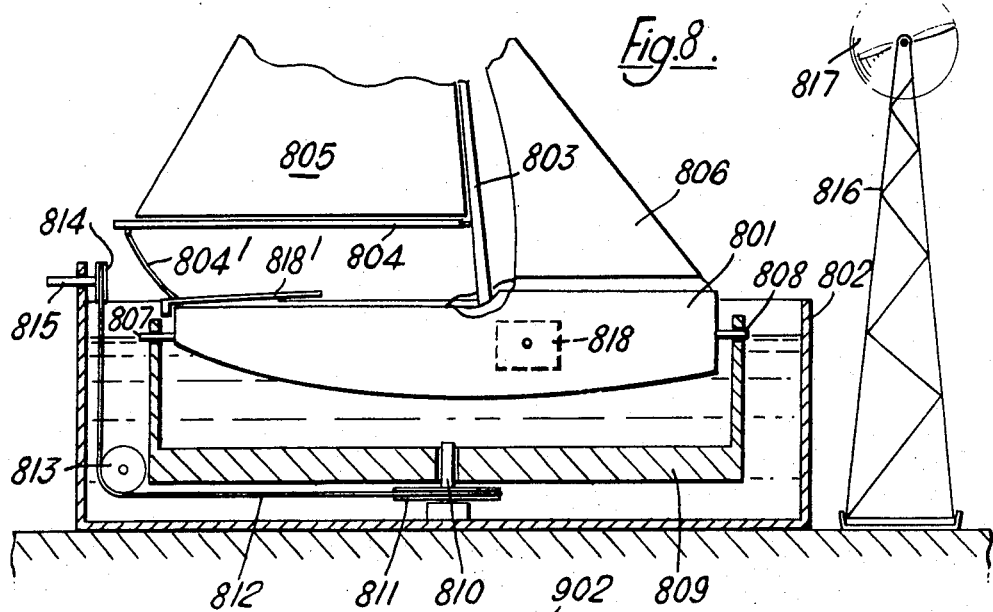
Figure 9:
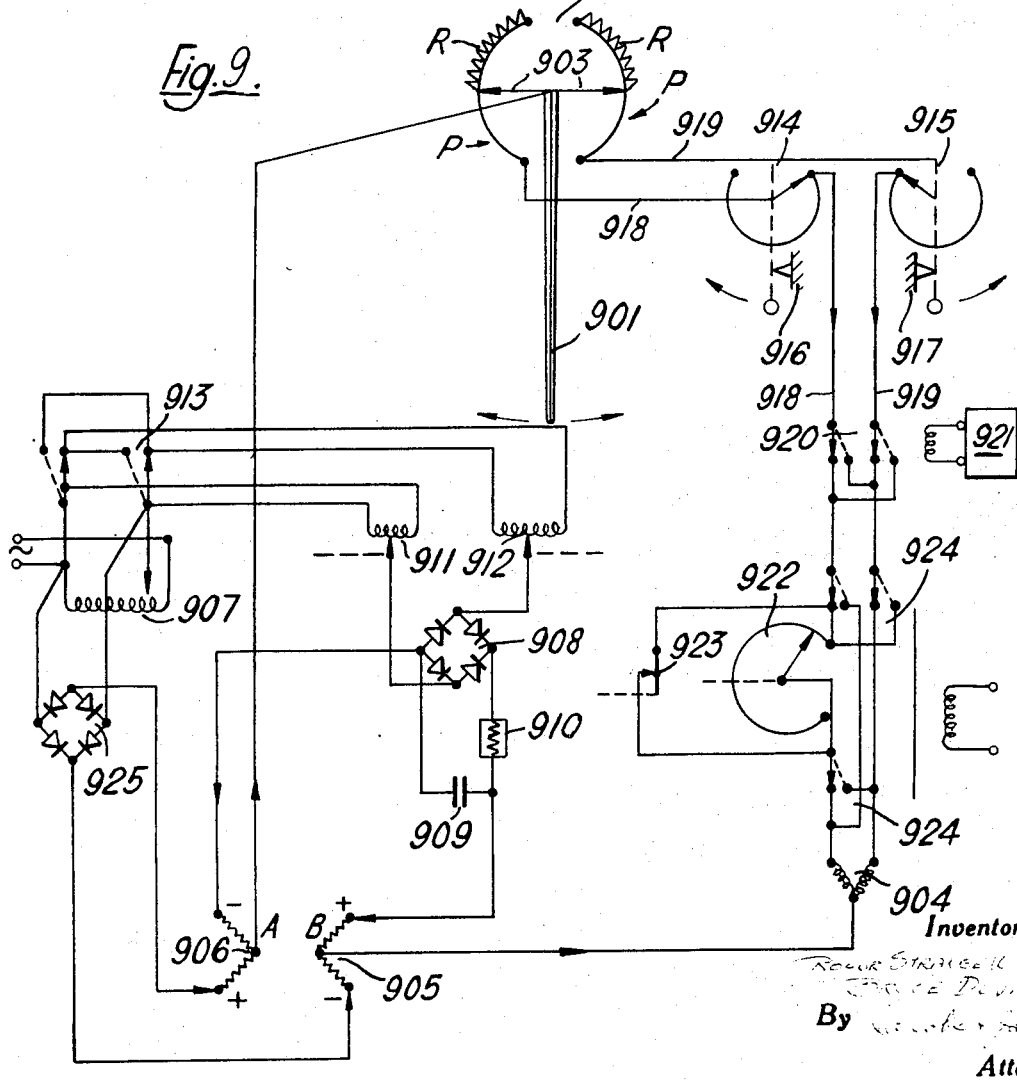

FIG. 3 shows the driving means for moving the hull of the simulator of FIG. 1 about its vertical and fore-aft axes, FIG. 4 shows the loading for the mainsheet of the simulator of FIG. 1, FIG. 5 shows details of the helm of the simulator of FIG. 1 in plan, FIG. 6 shows the electrical circuit associated with the helm of the simulator of FIG. 1, FIG. 7 shows the lay-out of the instructor's control panel of the simulator of FIG. 1, FIG. 8 is a diagrammatic drawing of a second simulator in accordance with the invention, and FIG. 9 shows an additional control system which may be employed on a simulator according to the invention.

The simulator has a large cruciform base 1 at the center of which is rotatably mounted a beam 2 which carries a racing hull 3. The hull is pivotally attached at its bow to an upright 4 at one end of the beam 2. At the stern, the hull is bolted to a plate 5 secured to a horizontal axle 6 having a driving pulley 7 connected therewith by a torsionally resilient coupling unit 8.

Mounted upon the beam 2 beneath the stern of the hull is a reversible D.C. electric motor 9 which drives a lead screw 10 having thereon a nut unit 11. A loop of stout wire cable, the ends of which are clamped to the nut, passes round guide pulleys 12, 13 and 14 and the driving pulley 7, to the periphery of which it is securely clamped to eliminate slip. As will be appreciated, rotation of the lead screw 10 by the motor causes the nut unit 11 to haul upon the cable and rotate the hull about its fore-aft axis. The motor is caused to run in either direction by a HEEL control upon the instructor's control panel 15. By this control the instructor can apply a required amount of heel, to port or to starboard, up to an amount, 5°, corresponding with capsizing. The resilient coupling unit 8 allows the pupil to reduce the heel by moving his position and, if appropriate, hanging out over the gunwale.

A tyred driving wheel 16 mounted at the end of the beam 2 and arranged to have a driving contact with the floor on which the base 1 stands is connected by a belt-drive 17 with another reversible D.C. electric motor 18 responsive to a tiller 19. The tiller is pivoted about a vertical axis located abaft the stern as with a normal tiller connected to a rudder. The after end of the tiller carries a sprocket 20 centered on the axis of the tiller. A short length of sprocket chain 21 passing round the sprocket 20 has its ends connected by springs 22 with a similar length of sprocket chain 23 which passes round a sprocket 24 carried by a fixed mounting (not shown) over the tiller. The sprocket 24 meshes with a small pinion 25 on the control spindle of a variable resistance unit 26 mounted under a bracket 27 which is pivotally mounted about an axis coincident with the axis of the sprocket 24.

As indicated in FIG. 6 the variable resistance unit is formed from a wire-wound linear potentiometer by removing a short section from the center of the winding. The outer ends of the winding are connected together. Rotation of the spindle by the pinion 25 away from the center point in either direction gives a progressively decreasing resistance.

The field winding of the motor 18 is energized with direct current from a bank of silicon rectifiers (not shown). The armature winding is fed from this bank via a thyristor circuit which includes the variable resistance unit 26. Progressive movement of the tiller from its neutral position, by progressively decreasing the resistance in the thyristor circuit causes the motor 18 to run progressively more rapidly. Accordingly the hull is driven about its vertical axis at a rate which depends upon the movement of the tiller. A reversing micro-switch actuated by a cam 127 on the spindle of the variable resistance unit 26 reverses the armature connections of the motor when the wiper blade 28 passes through the center position. Accordingly, the direction in which the hull is rotated by the motor 18 depends upon the direction in which the tiller is moved as in steering upon water.

On the panel 15 is a rheostat 29 connected in series with the resistance unit 26 and operable by a knob marked KNOTS provided with a scale marked in knots. By this knob the instructor can vary the sensitivity of the system so that a greater rate of turn is obtained for a given movement of the tiller at higher imagined speeds than at lower imagined speeds.

Adjacent to a seat 30 for the instructor is a pair of levers 31 and 32 from which bowden cable 33 and 34 lead to tension springs 35 and 36 connected with the tiller. By manipulating the levers 31 and 32 the instructor is able to simulate the changes in resistance of movement of the tiller experienced in normal sailing. By turning the KNOTS knob to a position marked "-sternway" the instructor is able to reverse the response of the hull to the tiller when teaching certain maneuvers. In this position of the knob, a cam on the rheostat operates a reversing switch for the motor 18.

Reference has already been made to bracket 27 being pivotally mounted. This bracket is movable about its pivot by an actuator 37 connected to the bracket by a link 38. This actuator is controlled by a switch on the panel 15 marked WEATHER HELM having a central off position and two mutually reversed running positions P and S. With this switch the instructor can move the resistance unit 26 relative to the sprocket 24 and thereby change the neutral position of the tiller to give weather helm and lee helm effects. A meter 39 on the panel 15 is arranged and calibrated to show the amount of weather or lee helm applied.

A main sheet 40 is connected with a boom 41 carried by a mast 42 which can be a short mast as shown or, where there is sufficient headroom, a mast of normal height. This mast is rotatably mounted and has a driving pinion 43 engaged with a rack 44 carried by a plunger 45 which extends into a tube 46 and terminates in an abutment 47. Stout springs 48 and 49 together biass the abutment 47 to a central position within the tube 46. At the end opposite the rack 44, the tube 46 is provided with a nut 48A engaged with a lead screw 49A rotatable by a motor 50. The motor 50 has a speed variation and reversing circuit similar to that of motor 18 but without a sensitivity control. The speed and direction of the motor are controlled by a BOOM knob on the panel 15 and by this knob the instructor can swing the boom to port or starboard by any required amount which is indicated by a calibrated meter 41A. By hauling upon the mainsheet 40 the pupil is able to move the boom inwardly against the spring 48 or the spring 49 depending upon whether the boom is to port or starboard.

The boom motor 50 and associated mechanism are concealed by a bulkhead in the bow of the hull and the mechanism for rotating the hull about its two axes is enclosed by a casing 51, 52.

With the simulator just described with reference to the drawings, a pupil is enabled to learn and practise the principal features of the art of sailing under the guidance of an instructor operating the control panel and levers 31 and 32 to simulate the principal effects of the pupil's actions.

The services of the instructor may be dispensed with, or the need for his continuous attention minimized, by providing the simulator described with an arrangement for sensing the direction of the apparent wind as described in our U. S. Pat. No. 3,457,783, an arrangement for controlling the degree of heel as described in our U. S. Pat. No. 3,531,875, or an arrangement for controlling the boom as described in our U.S. Pat. No. 3,540,134 or a combination of two or more of said arrangements.

In the simulator of FIG. 8 a sailing craft having a hull 801 floats in a tank of water 802 of sufficient size to enable the hull to change its heading through 360°. The hull has a mast 803 carrying a boom 804 and mainsail 805 and a jib sail 806.

At its ends the hull has trunnions 807 and 808 pivotal in a frame 809 which is rotatable about a bearing spindle 810 secured to the bottom of the tank. The frame has a loose fit on the spindle 810 and the spindle is of sufficient length to enable the frame to slide in a vertical direction thereover to allow for different loadings of the hull which is supported by the buoyancy of the water.

Attached to the frame 809 and surrounding the spindle is a pulley 811. For the rotation of the frame via the pulley there is provided a steel cable 812 which passes around a pair of submerged guiding pulleys, of which one, 813, is shown, to a drum or pulley 814 secured to a shaft 815 mounted on the wall of the tank.

Adjacent to the tank is a tower structure 816 carrying a motorized fan 817 to produce a wind directed at the sails. The tower is movable around the tank to enable the direction of the wind to be changed by an instructor.

On the hull is a tiller 818' and attached to the boom 804 is a main sheet (rope) 804'. The tiller and main sheet are the controls to be operated by the pupil.

The heading of the hull is variable through 360° by rotation of the shaft 815. The shaft may be rotated by an electric motor. This motor may be provided with a control circuit operated by the tiller as described with reference to FIGS. 3, 5 and 6 or may be controlled by an instructor who observes the tiller movements made by the pupil.

As the heading of the hull is changed, the boom 804 is moved by the effect of the wind from fan 817 acting upon the mainsail to give a boom behavior similar to that encountered with a vessel being sailed upon water.

It is desirable that the hull should adopt heeling motions, especially after the pupil has received preliminary instruction. For this purpose the fan may be designed to produce sufficient wind output to provide adequate heeling force upon the sails 805 and 806. Alternatively, the wind output may be made sufficient only to adjust the position of the sails and heeling may be provided by separate driving means, for example a weight shown diagrammatically at 818 which is movable from side to side of the hull in the beam direction. The weight may be moved, for example, by a screw driven in a manner similar to the screw 10 of FIG. 3. The movement of the weight may be by a manual control operated by an instructor, or by automatic apparatus such as is described in U. S. Pat. No. 3,531,875.

In an alternative arrangement, the weight may be moved by a servo-motor responsive to a transducer arranged to sense the strength of the wind directly or via the main sheet. A convenient form of transducer is a rheostat, the resistance of which varies with the wind force.

FIG. 9 shows a system for providing realistic effects of the speed and direction of travel through the water, on the response of the helm. The system is suitable for a simulator of the automatic type whereas the system described with reference to FIGS. 1 to 7 requires the continuous presence of an instructor to adjust the response of the helm.

The system gives the following effects:
a. there is no response to the helm when stationary conditions are being simulated,
b. the response to the helm is reversed when the craft is to be regarded as travelling backwards,
c. The response to the helm is proportional to the supposed forward speed in normal sailing,
d. the rate at which the response to the helm changes is affected by inertia and momentum as in a true sailing craft upon water,
e. it is impossible to simulate bringing the craft head-on to the wind by means of the helm if the pupil tries to sail close-hauled with the center-board raised; it is desirable to provide the simulator with a center-board, or at least the handling tackle therefor, in order to provide additional realism,
f. the response to the helm center varies with the heeling of the hull to simulate the effects of lee-helm and weather-helm.

The following information is fed into the system:
1. the supposed wind force,
2. the angle between the supposed wind and the fore-aft line of the hull,
3. the angle between the supposed wind and the boom,
4. the position of the helm,
5. the angle of heel of the hull,
6. the position of the center-board.

Referring now to FIG. 9, the helm, i.e. tiller 901 is attached to the brush gear of a special variable resistor 902 which is made with two separate tracks, each track being half resistive at R and half plain conductor at P. When the tiller is on center the brush gear 903, which is common to both tracks, is in contact with both plain sections and therefore if no intermediate modulator is disturbing equilibrium the coils 904 for a servo valve (not shown) operable to produce changes of heading of the hull by a hydraulic actuator (not shown). Each coil of the servo valve experiences the same potential difference which appears at A and B. When the tiller 901 is moved in either direction, one brush continues to collect full potential and the other collects a potential reduced to an extent corresponding with the degree of displacement of the tiller. As a result the coils of the servo valve 904 are out of balance and the hull turns in a direction corresponding with the direction of unbalance and continues to do so until either the tiller is centered once more or one of the modulators introduces a disturbing influence. The potential which appears at A–B is the resultant of the two potentials fed in via resistors 905 and 906. The potential applied from a variable transformer 907 represents the wind force. When this transformer is set at maximum output, the maximum wind force effect is available. When it is set at zero output, the effect of no wind is represented. Adjustment of the transformer either progressively or in steps allows transition from one wind force to another. The potential applied from a rectifier bridge 908 represents the set of the mainsail and is controlled by a capacitor 909 and a thermistor 910. The capacitor 909 represents the hull's inertia and the thermistor 910 represents its momentum. The input potential to the bridge 908 comes from the brush gear of two variable transformers 911 and 912 which are fed from the transformer 907 which supplies the wind force potential. The transformer 911 is controlled by a symmetrical cam, representing wind direction, which displaces the transformer brush to one side only of center. A transformer 912 is controlled by a rack driven by the displacement of the boom of the simulator from the position to which the wind is trying to bring it, in this case the displacement of the brush gear is therefore equal about the center point and so the applied potential is reversed through a double pole changeover relay 913, which changes over as the wind changes from port to starboard. Variable resistors 914 and 915 are each pendulum operated. By the provision of stops 916 and 917 the pendulums are restricted to swing in opposite ways from vertical. Thus when the hull heels, one only of the resistors is operated and introduces resistance into one or the other of the supply lines 918 and 919. The double pole changeover relay 920 is controlled by the unit 921 which decides from the boat's speed of turn and angle to the wind whether tiller response should be normal or reverse. The variable resistor 922 is driven by a symmetrical cam representing wind direction. The switch 923 is open when the center-board is up which means that resistor 922 is in circuit. When the center-board is down the resistor 922 is shortcircuited and ineffective. A triple pole changeover relay 924 decides whether the effect is to be applicable to port or starboard wind direction by introducing the resistor of 922 into either line 918 or line 919.

When the system is representing the sails aligned with the wind, and the vessel therefore moving very slowly or not at all, the transformer 911 is well off center while transformer 912 remains on center and a potential exists between their brush gear. This potential is rectified through bridge 908 and reaches A-B after charging the condencer 909 and warming up the thermistor 910 to reduce its resistance to a low value. The component values are so chosen that the potential at A-B is close to zero when the wind is coming forward of the beam and the mainsail is unset. When the mainsail is correctly set the transformer 912 driven by the boom being hauled in, comes to a balance point with transformer 911, the potential at A-B begins to rise as the condenser loses its charge and there is a falling voltage opposing the potential coming from the transformer 907 via a rectifier 925. Thus the turn rate progressively rises as the mainsail is better set.

The transformer 911 changes its setting as the boat and wind move relative to one another, and setting the mainsail to the correct position for any particular wind angle brings the transformer 912 into balance with 911.

If the boat is made to go through the wind too slowly the module 921 stops the boat head to wind, the transformers 911 and 912 will be out of balance and the turn rate will be falling to a low rate as the thermistor 910 warms up and allows an opposing potential to flow from rectifier bridge 908. After a pause representing inertia module 921 reverses the tiller connections to the servo windings 904 by means of the relay 920 and the helm answers backwards because the boat would in reality be drifting backwards.

Appropriate tiller movements and setting the sails will restore normal helm response. The effect of the center-board's position on the boat's ability to sail close hauled is illustrated by sailing at about 45° to the wind with the center-board down (which is its correct position) and then raising the board with the tiller steady on center. At 45° to the wind the resistor 922 will have been set to a suitable value which will not effect the circuit as the switch 923 will be closed with the centerboard down. As soon as the center-board is raised the resistance of 922 comes into circuit as the switch 923 opens; the effect is introduced either into the port or starboard lines 918 and 919 according to which tack the boat is on, the appropriate switching being controlled by the relay 924. The effect of introducing resistance 922 into the circuit is to unbalance the servo valve coils 904 and the boat at once turns away from the wind and refuses to sail as close to the wind as it does with the center-board down. As soon as the center-board is lowered the boat sails up into the wind once more. If the boat is allowed to sail off the wind far enough with the center-board up, the variable resistor 922 is adjusted to zero resistance, and the tiller responds normally.

The pendulums 916 and 917 operate the variable resistors 914 and 915 respectively. When the hull heels downwind either pendulum 916 will turn resistor 914 (or pendulum 917 will turn resistor 915) thus introducing resistance into line 918 or line 919 to unbalance the valve coils 904 and the hull turns to port or starboard up into the wind according to which tack (port or starboard) the boat is sailing on, thus representing weather helm. Lee helm is obtained in a similar manner.

The two ultimate control factors are:
1. The potential appearing at A and B which represents the speed of the boat through the water.
2. The polarity and balance of the potential at A−B which appears at the servo valve 904. This represents the direction of turn due to the tiller setting and wind direction to the hull.

It should be noted that the potential at A and B can also be used to drive a speed indicating device and/or a course plotting device.

I claim:

1. For a sailing simulator having a hull unit mounted for heeling motion, a helm, a reversible and stoppable variable-speed turning motor for simulating variation of the heading of the hull unit in response to the helm and a control circuit for reversing and stopping the motor and varying the speed of the motor in response to the helm, steering sensitivity control means in said control circuit for varying the speed of the motor for a given setting of the helm, said sensitivity control means including speed correction means operable to increase the speed of the motor with increase of force of a supposed wind.

2. Sensitivity control means according to claim 1 including inertia control means comprising a capacitor and a thermistor for simulating the effect of the inertia of a sailing craft upon steering.

3. Sensitivity control means according to claim 1 comprising means for providing a wind force signal representative of wind force, means for providing a modifying signal representative of a sailing situation, means for modifying the wind force signal by the modifying signal to yield an output dependent upon wind force and the sailing situation for regulating the reversible and stoppable variable-speed turning motor.

4. Sensitivity control means according to claim 3 in which the means for providing the wind force signal is a variable transformer and the means for modifying the wind force signal is responsive to the output voltage of the transformer and to a voltage dependent upon the sailing situation.

5. Sensitivity control means according to claim 4 in which means for providing the voltage dependent upon the sailing situation is a pair of variable transformers giving outputs representative respectively of wind direction and the direction of a boom, said pair of transformers providing a differential output voltage for modifying the wind force signal.

6. Sensitivity control means for modifying the response of a sailing simulator having a hull unit, a boom, a helm and reversible stoppable variable-speed drive arranged to simulate changes of heading of the hull unit in response to the helm, and a transducer for providing a signal representative of wind force, said sensitivity control means comprising an input for a signal representing wind direction, an input for a signal representing boom position and a signal combining device for combining the signals from said transducer and said inputs to produce a control output for the reversible stoppable variable-speed drive dependent upon wind force, wind direction and boom position so that the simulated changes of heading of the hull unit in response to the helm are comparable with the changes of heading of a sailing craft sailing upon water.

7. Sensitivity control means according to claim 6 having signal generator means responsive to heeling of the hull to vary the control output.

8. Sensitivity control means according to claim 6 having a switching device for connecting the control output with a signal dependent upon wind direction, said switching device thereby providing a modification of helm response simulating the effect of raising and lowering a center board.

* * * * *